(12) United States Patent
Salleh et al.

(10) Patent No.: US 9,806,817 B2
(45) Date of Patent: Oct. 31, 2017

(54) WAVELENGTH DIVISION MULTIPLEXING PASSIVE OPTICAL NETWORK SYSTEM

(71) Applicant: Telekom Malaysia Berhad, Kuala Lumpur (MY)

(72) Inventors: Mohd. Shahril Bin Salleh, Seri Kembangan (MY); Ummi Supya Binti Ismail, Bangi (MY); Asmahanim Bte Ahmad, Seri Kembangan (MY); Drees Andriyanto, Jawa Barat (ID); Muhammad Zamzuri bin, Kajang (MY); Zulhedry Abdul Manaf, Bangi (MY)

(73) Assignee: TELEKOM MALAYSIA BERHAD, Bangi (MY)

( * ) Notice: Subject to any disclaimer, the term of this patent is extended or adjusted under 35 U.S.C. 154(b) by 0 days.

(21) Appl. No.: 14/291,392

(22) Filed: May 30, 2014

(65) Prior Publication Data

US 2014/0355990 A1 Dec. 4, 2014

(51) Int. Cl.
*H04J 14/00* (2006.01)
*H04B 10/00* (2013.01)
(Continued)

(52) U.S. Cl.
CPC ..... *H04B 10/2587* (2013.01); *H04B 10/2503* (2013.01); *H04B 10/40* (2013.01); *H04J 2014/0253* (2013.01)

(58) Field of Classification Search
CPC .............................................. H04J 2014/0253
(Continued)

(56) References Cited

U.S. PATENT DOCUMENTS 5,559,624 A * 9/1996 Darcie ................. H04B 10/071
398/167.5
8,437,637 B2 * 5/2013 Xu ....................... H04B 10/272
398/68

(Continued)

OTHER PUBLICATIONS

Goff, David R., Fiber Optic Reference Guide: A Practical Guide to Communications Technology, 2002, p. 84.*

(Continued)

*Primary Examiner* — Ken N Vanderpuye
*Assistant Examiner* — Jai Lee
(74) *Attorney, Agent, or Firm* — McCarter & English, LLP

(57) ABSTRACT

This disclosure describes a wavelength division multiplexing passive optical network system (100) comprising an optical line terminal (180) for controlling transmission of data that are carried by optical signals across the optical network system along an upstream or downstream path; a signal modulating loop circuit including a circulator (110) connected to the optical line terminal (180) for determining the transmission paths of the optical signals; a splitter (120) connected to the circulator (110) for splitting the optical signals into a first portion of optical signals and a second portion of optical signals according to a predetermined ratio; an amplifier (160) connected to the splitter (120) for amplifying the second portion of optical signals; and a modulator (170) connected in between the amplifier (160) and the splitter (120) for modulating the amplified second portion of optical signals to be transmitted to the circulator (110); a converter (140) connected to the splitter (130) for converting the first portion of optical signals into electrical signals; and one or more optical network units (150) connected in between the converter (140) and modulator (170) for receiving the electrical signals from the converter (140), and transmitting electrical signals to the modulator (170) for converting the electrical signals into optical signals to be transmitted together with the amplified second portion of optical signals to the optical line terminal (180); wherein the circulator (110) directs the optical signals received from the modulator (170) to the splitter (120) for being transmitted back into the signal modulating loop circuit and/or towards the optical network units along the downstream path, or towards the optical line terminal along the upstream path.

3 Claims, 2 Drawing Sheets

(51) Int. Cl.
*H04B 10/04* (2006.01)
*H04B 10/2587* (2013.01)
*H04B 10/40* (2013.01)
*H04B 10/25* (2013.01)
*H04J 14/02* (2006.01)

(58) Field of Classification Search
USPC ........................................ 398/169, 170, 167
See application file for complete search history.

(56) References Cited

U.S. PATENT DOCUMENTS

| | | | |
|---|---|---|---|
| 9,008,513 B2* | 4/2015 | Kim | H04J 14/0282 398/67 |
| 2004/0091265 A1* | 5/2004 | Kim | H04B 10/2587 398/72 |
| 2007/0133990 A1* | 6/2007 | Kim | B82Y 20/00 398/72 |
| 2008/0131120 A1* | 6/2008 | Yu | H04B 10/2587 398/58 |
| 2011/0091214 A1* | 4/2011 | Cheng | H04B 10/2587 398/91 |
| 2011/0200333 A1* | 8/2011 | Schrenk | H04B 10/2587 398/67 |
| 2012/0057875 A1* | 3/2012 | Nagarajan | H04J 14/0246 398/82 |
| 2015/0030334 A1* | 1/2015 | Eiselt | H04B 10/2575 398/79 |

OTHER PUBLICATIONS

Kartalopoulos, Stamatios, Next Genreation Intelligent Optical Networks: From Access to Backbone, 2008, p. 85.*
Maziotis et al., Wavelength Reuse in a Colourless ONU with All-Optical Clock Recovery for Full-Duplex Dense WDM PONs, 2011, IEEE, p. 1-4.*

* cited by examiner

WAVELENGTH DIVISION MULTIPLEXING PASSIVE OPTICAL NETWORK SYSTEM

The present application claims priority under 35 U.S.C. §119 to Malaysian Application No. PI 2013002000, filed May 31, 2013, and hereby incorporated by reference in its entirety.

FIELD OF INVENTION

The invention disclosed here relates in general to a wavelength division multiplexing passive optical network (WDM-PON) system with an architecture that enables change of transmission paths for signals carrying data and increase of data bandwidth with minimal application of fibers and components.

BACKGROUND OF THE INVENTION

A passive optical network (PON) is a point-to-multipoint network architecture in which unpowered optical splitters are used to enable a single optical fiber to serve multiple premises. A PON typically includes an Optical Line Terminal (OLT) at the central office of the service provider that is connected to a number of Optical Network Units (ONUs) near the end users.

In operation, downstream signals are broadcast from the OLT to the ONUs on a shared fiber network. Various techniques, such as encryption, can be used to ensure that each ONU can only receive signals that are addressed to it. Upstream signals are transmitted from each ONU to the OLT, using a multiple access protocol, such as time division multiple access (TDMA), to prevent "collisions". To increase the upstream and/or downstream bandwidth available to end users, Wavelength Division Multiplexing PON, or WDM-PON that utilizes multiple optical wavelengths is employed.

With increasing subscription and usage of PON, corresponding PON equipment and sales are likewise to escalate. Transmission over such networks may be limited by the increasing data demand on existing PON. Limited bandwidth often results in limited services being provided to customers. Added expense and investment from deploying additional fibers to address these bandwidth issues is not cost effective.

In light of the foregoing discussion, there is a need of improvements to improve the passage of the upstream and downstream data bandwidth stream available to end users.

SUMMARY OF INVENTION

One aspect of this disclosure is to provide an optical network unit (ONU) for a wavelength division multiplexing passive optical network (WDM PON) that generates colorless wavelength.

Another aspect of this disclosure is to provide a WDM PON system which is capable of increasing the upstream and downstream data bandwidth stream with minimal usage of fibers and components.

Still another aspect of this disclosure is to provide a WDM PON system that enables the change of transmission paths of the signals carrying the data.

Yet another aspect of this disclosure is to provide a WDM PON system that reduces optical noise with the addition of isolators to prevent the happening of signal reflection in the system.

At least one of the preceding aspects is met, in whole or in part, by this disclosure, in which the embodiment of this disclosure describes a wavelength division multiplexing passive optical network system (100) comprising an optical line terminal (180) for controlling transmission of data that are carried by optical signals across the optical network system along an upstream or downstream path; a signal modulating loop circuit including a circulator (110) connected to the optical line terminal (180) for determining the transmission paths of the optical signals; a splitter (120) connected to the circulator (110) for splitting the optical signals into a first portion of optical signals and a second portion of optical signals according to a predetermined ratio; an amplifier (160) connected to the splitter (120) for amplifying the second portion of optical signals; and a modulator (170) connected in between the amplifier (160) and the splitter (120) for modulating the amplified second portion of optical signals to be transmitted to the circulator (110); a converter (140) connected to the splitter (130) for converting the first portion of optical signals into electrical signals; and one or more optical network units (150) connected in between the converter (140) and modulator (170) for receiving the electrical signals from the converter (140), and transmitting electrical signals to the modulator (170) for converting the electrical signals into optical signals to be transmitted together with the amplified second portion of optical signals to the optical line terminal (180); wherein the circulator (110) directs the optical signals received from the modulator (170) to the splitter (120) for being transmitted back into the signal modulating loop circuit and/or towards the optical network units along the downstream path, or towards the optical line terminal along the upstream path.

Another preferred embodiment of the present invention is a wavelength division multiplexing passive optical network system (200) that comprises an optical line terminal (280) for controlling transmission of data that are carried by optical signals across the optical network system along an upstream or downstream path; a splitter (220) for splitting the optical signals into a first portion and a second portion according to a predetermined ratio; a signal modulating loop circuit including a circulator (210) connected to the splitter for determining the transmission paths of the second portion of optical signals; an amplifier (260) connected to the circulator (210) for amplifying the second portion of optical signals; and a modulator (270) connected to the amplifier (260) for modulating the amplified second portion of optical signals to be transmitted back to the splitter (220); a converter (240) connected to the splitter (220) for converting the first portion of optical signals into electrical signals; and one or more optical network units (ONUs) (250) connected in between the converter (240) and modulator (270) for receiving the electrical signals from the converter (240), and transmitting electrical signals to the modulator (270) for converting the electrical signals into optical signals to be transmitted together with the amplified second portion of optical signals to the optical line terminal (280); wherein the circulator (210) directs the optical signals received from the modulator (270) around the signal modulating loop circuit and/or to the splitter (220) to be transmitted towards the optical network units (250) along the downstream path, or towards the optical line terminal (280) along the upstream path.

DETAILED DESCRIPTION OF THE INVENTION

Figure 1:
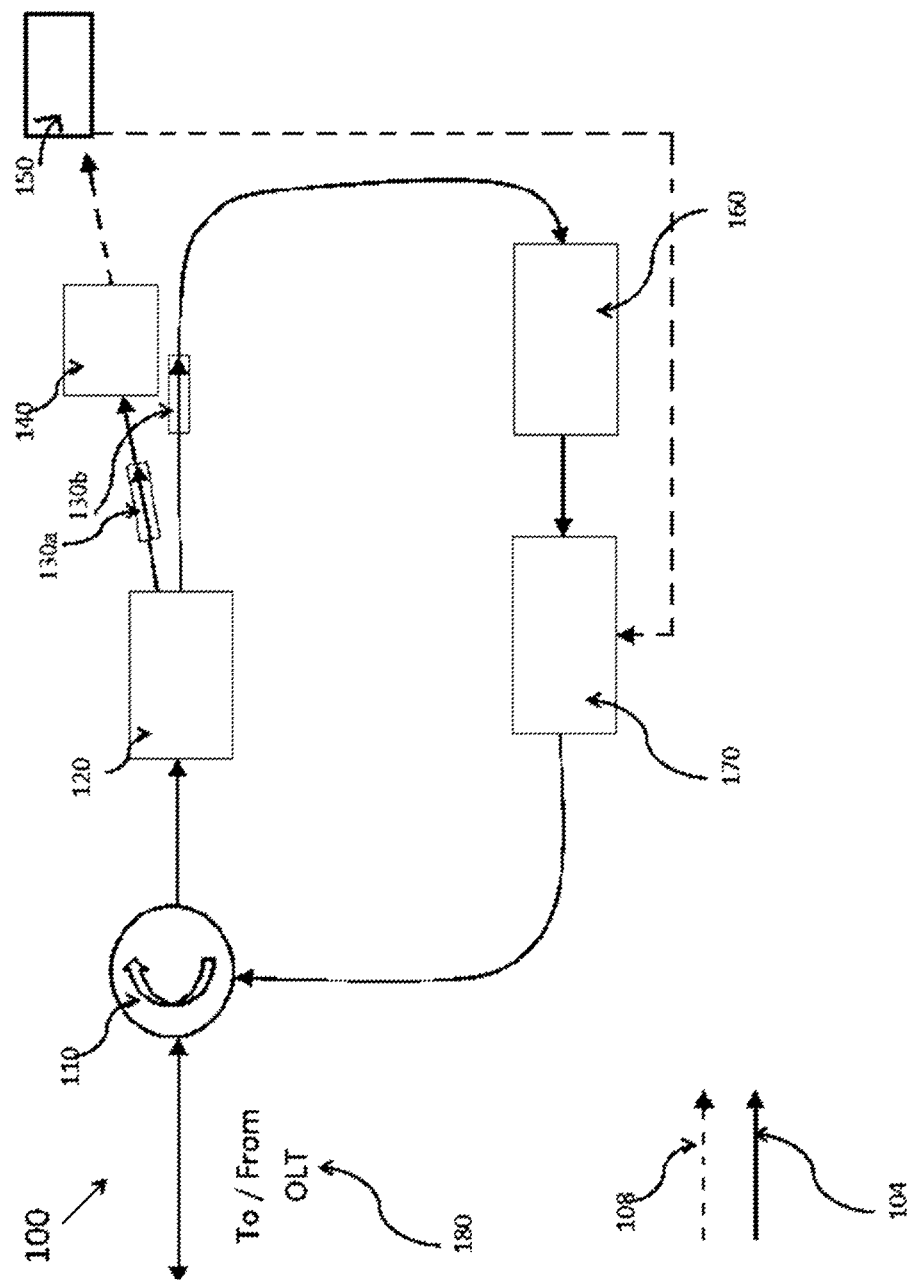
FIG. 1 shows the first preferred embodiment of the WDM PON system.

While the preferred embodiments of the invention have been illustrated and described, it will be clear that the invention is not limited to theses embodiments only. Numerous modifications, changes, variations, substitutions and equivalents will be apparent to those skilled in the art without parting from the spirit and scope of the invention.

It is to be understood that the present embodiments are described in terms of a passive optical network (PON); however, other optical networks can be contemplated for the present teachings. While FIG. 1 and FIG. 2 show illustrative optical hardware configurations, these configurations may be reconfigured or combined to provide functionality within the scope of the present principles.

The present invention in the form of one or more exemplary embodiments will now be described. Persons of ordinary skill in the art will realize that the following description of the present invention is illustrative only and not in any way limiting. Other embodiments of the invention will readily suggest themselves to such skilled persons having the benefit of this disclosure.

This disclosure describes a wavelength division multiplexing passive optical network system (100) comprising an optical line terminal (OLT) (180) for controlling transmission of data that are carried by optical signals across the optical network system along an upstream or downstream path; a signal modulating loop circuit including a circulator (110) connected to the optical line terminal (180) for determining the transmission paths of the optical signals; a splitter (120) connected to the circulator (110) for splitting the optical signals into a first portion of optical signals and a second portion of optical signals according to a predetermined ratio; an amplifier (160) connected to the splitter (120) for amplifying the second portion of optical signals; and a modulator (170) connected in between the amplifier (160) and the splitter (120) for modulating the amplified second portion of optical signals to be transmitted to the circulator (110); a converter (140) connected to the splitter (130) for converting the first portion of optical signals into electrical signals; and one or more optical network units (150) connected in between the converter (140) and modulator (170) for receiving the electrical signals from the converter (140), and transmitting electrical signals to the modulator (170) for converting the electrical signals into optical signals to be transmitted together with the amplified second portion of optical signals to the optical line terminal (180); wherein the circulator (110) directs the optical signals received from the modulator (170) to the splitter (120) for being transmitted back into the signal modulating loop circuit and/or towards the optical network units (ONU) along the downstream path, or towards the optical line terminal along the upstream path.

Figure 2:
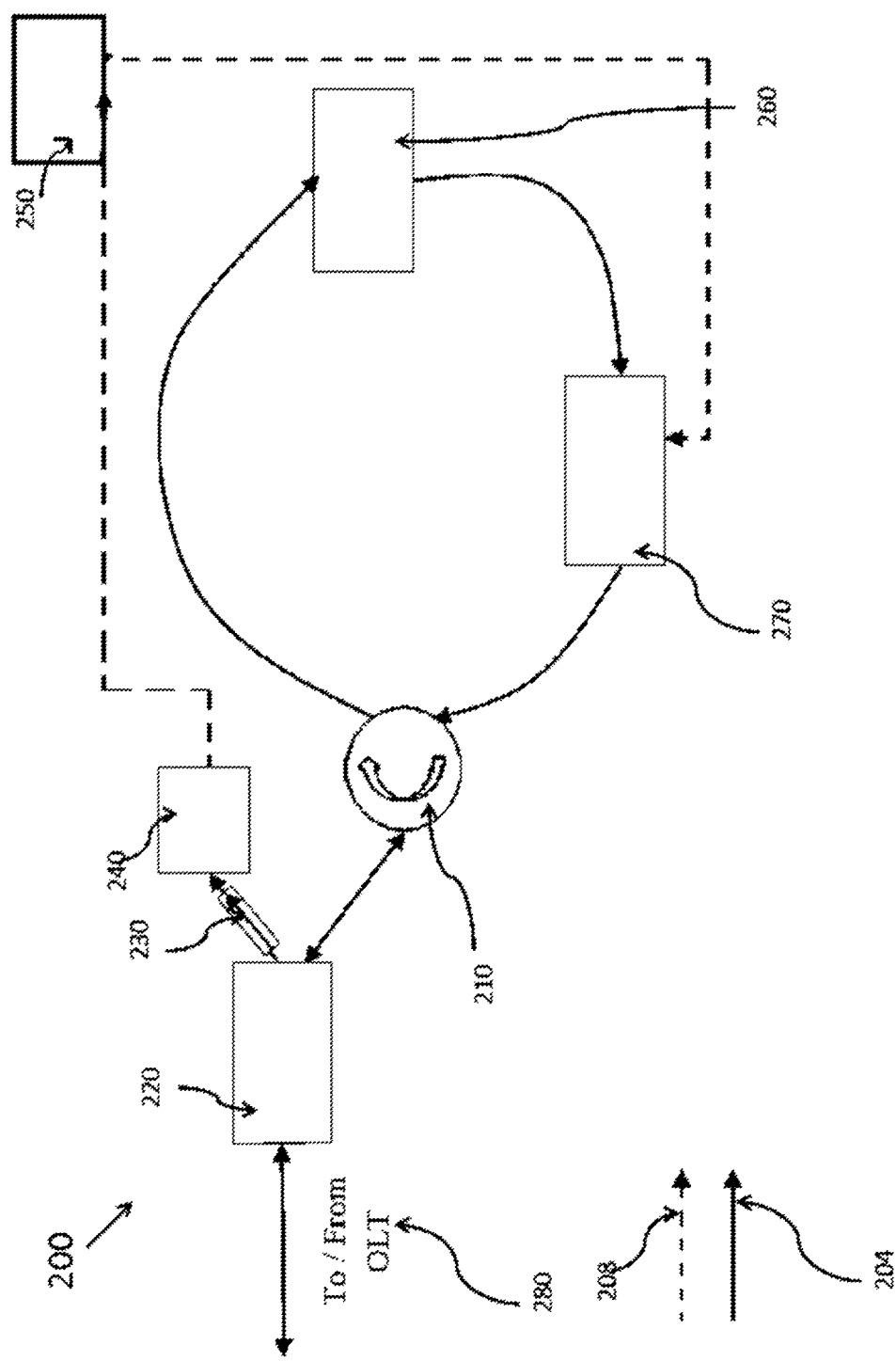
FIG. 2 shows the second preferred embodiment of the WDM PON system.

Referring to FIG. 1, an illustrative of the first preferred embodiment of the WDM-PON system (100) is shown in greater detail for an exemplary implementation in accordance with the present principles. Data are carried by optical signals over the optical fibers (104) from the OLT (180) and preferably and eventually to the ONUs (150). The optical fibers (104) are preferably a single mode fiber (SMF). In accordance with the present principles, the optical signals are carrier signals generated for carrying data along the downstream path to the ONU (150) via the circulator (110) from the OLT (180). These data are to pass through the circulator (110). From the OLT (180) to the circulator (110) over the optical fibers (104) is to be permitted multiple-way light-wave propagation through the optical fibers (104). The circulator (110) circulates the optical signals such to determine which direction for the data to travel, either towards the splitter (120) and subsequently the ONU (150), and towards the splitter (120) and subsequently the signal modulating loop circuit, or from the modulator (170) and then back to the OLT (180).

For the data that travels from the circulator (110) to the splitter (120), these data are split. The result is the signal is sent in at least two paths. The splitter (120) is to split a first portion of the optical signals for transmission towards the first optical isolator (130a) and the ONU (150), and a second portion of optical signals to the semiconductor optical amplifier (SOA) (160) and around the signal modulating loop circuit. Note the 70:30 splitting percentage is the preferred predetermined ratio, but the invention is not limited to one determined set ratio.

The optical isolator (130) allows one direction of optical signal. The preferred embodiment utilizes more than one optical isolator (130); such that each path from the splitter (120) is protected with the first (130a) and the second optical isolator (130b) respectively. The optical isolators (130) protect, and prevent, the optical signal to reflect back upstream at this point, and such have the optical signal to continue traveling downstream to the converter (140).

Downstream data carried by the first portion of optical signals over the optical fibers (104) are input to the converter for converting the optical signals to electrical signals. Data here are now preferably carried by electrical signals over the electrical fibers (108) from the converter (140) to the ONU (150). On the other hand, the second portion of optical signals is transmitted into the signal modulating loop circuit for amplifying and modulating the optical signals. The second optical isolator (130b) is connected in between the splitter (120) and amplifier (160). The optical signals that are modulated by the modulator (170) are circulated back to the circulator (110) to be sent either along the downstream path towards the ONUs (150) or back into the signal modulating loop circuit, or along the upstream path towards the OLT (180).

Upstream data transmitted from the ONUs (150) through electrical signals arrive at the modulator (170) for being converted into optical signals. The newly converted optical signals are also circulated by the circulator (110) to be further transmitted along the upstream or downstream paths, or back into the signal modulating loop circuit.

Referring to FIG. 2, an illustrative second preferred embodiment of the WDM-PON system (200) is shown in greater detail for an alternative implementation in accordance with the present principles. The optical network system (200) describes a wavelength division multiplexing passive optical network system (200) that comprises an optical line terminal (280) for controlling transmission of data that are carried by optical signals across the optical network system along an upstream or downstream path; a splitter (220) for splitting the optical signals into a first portion and a second portion according to a predetermined ratio; a signal modulating loop circuit including a circulator (210) connected to the splitter for determining the transmission paths of the second portion of optical signals; an amplifier (260) connected to the circulator (210) for amplifying the second portion of optical signals; and a modulator (270) connected to the amplifier (260) for modulating the amplified second portion of optical signals to be transmitted back to the splitter (220); a converter (240) connected to the splitter (220) for converting the first portion of optical signals into electrical signals; and one or more optical network units (ONUs) (250) connected in between the converter (240) and modulator (270) for receiving the electrical signals from the converter (240), and transmitting electrical signals to the modulator (270) for converting the electrical signals (into optical signals to be transmitted together with the amplified second portion of optical signals to the optical line terminal (280); wherein the circulator (210) directs the optical signals received from the modulator (270) around the signal modulating loop circuit and/or to the splitter (220) to be transmitted towards the optical network units (250) along the downstream path, or towards the optical line terminal (280) along the upstream path.

Data are carried by optical signals over the optical fibers (204) from the OLT (280) and preferably and eventually to the ONU (250). The optical fibers (204) are preferably a single mode fiber (SMF). In accordance with the present principles, the optical signals being the data carrier signals are generated for the transmission of data to the ONU (250) via the splitter (220) from the OLT (280). These data are to pass through the splitter (220). From the OLT (280) to the splitter (220) over the optical fibers (204) is to be permitted multiple-way light-wave propagation through the optical fibers (204).

For the data that travels from the splitter (220), these data are split into the first portion and a second portion based on the predetermined ratio to at least two paths. The first portion of the optical signals is transmitted towards the optical isolator (230) and the ONU (250), and the second portion of the optical signals to the circulator (210) to be circulated around the signal modulating loop circuit, or in the upstream direction back to the OLT (280). Again, the 70:30 splitting percentage is the preferred ratio, but the invention is not limited to one determined set ratio.

The optical isolator (230) connected to the converter allows one direction of optical signal. Here the optical isolator (240) is utilized to make certain that the data transmitted from the OLT (280) is sent to the ONU (250) in the downstream direction. This is necessary to avoid the optical signal from reflecting back upstream at this point, and such have the optical signal to continue downstream to the converter (240).

Data carried here by the first portion of the optical signals over the optical fibers 204 in the downstream path are input to the converter (240) for converting the optical signals to electrical signals. The electrical signals with the data are transmitted to the ONU (250) through electrical fibers (208).

The second portion of the optical signals are transmitted to the circulator (210) that determines which direction for the data to travel, either towards the amplifier (260) which is preferably a SOA, or from the modulator (270) and then back to the OLT (280). The second portion of optical signals is transmitted to the amplifier for signal amplification. Upon signal amplification, the optical power is transmitted to the modulator (270).

Subsequently the data are carried by electrical signals from the ONU (250) in an upstream direction to the modulator (270), for converting the electrical signals to optical signals back to the splitter (210) and then to the OLT (280). The circulator (210) also can operate to decide to not pass the amplified signals again towards the OLT (280) but rather re-route back to the signal modulating loop circuit.

Although the description above contains many specifications, it is understood that the embodiments of the preferred form are not to be regarded as a departure from the invention and it may be modified within the scope of the appended claims.

The invention claimed is:

1. A wavelength division multiplexing passive optical network system comprising
    an optical line terminal for controlling transmission of data that are carried by optical signals across the optical network system along an upstream or downstream path;
    a splitter for splitting the optical signals into a first portion and a second portion according to a predetermined ratio;
    a signal modulating loop circuit including
        a circulator connected to the splitter for determining the transmission paths of the second portion of optical signals;
        an amplifier connected to the circulator for amplifying the second portion of optical signals; and
        a modulator connected to the amplifier for modulating the amplified second portion of optical signals to be transmitted back to the splitter;
    a converter connected to the splitter for converting the first portion of optical signals into electrical signals; and
    one or more optical network units (ONUs) comprising the converter and the modulator for receiving the electrical signals from the converter, and transmitting electrical signals to the modulator for converting the electrical signals into optical signals to be transmitted together with the amplified second portion of optical signals to the optical line terminal;
    wherein the circulator directs the optical signals received from the modulator around the signal modulating loop circuit and/or to the splitter to be transmitted towards the optical network units along the downstream path, or towards the optical line terminal along the upstream path.

2. A wavelength division multiplexing passive optical network system according to claim 1, further comprising an optical isolator in between the splitter and the converter to ensure that the first portion of optical signals travel along the downstream path towards the converter.

3. A wavelength division multiplexing passive optical network system according to claim 1, wherein the amplifier is a semiconductor optical amplifier.

* * * * *